United States Patent
Zimmerman et al.

(10) Patent No.: US 7,541,929 B2
(45) Date of Patent: *Jun. 2, 2009

(54) READ AUTHENTICATION METHOD AND SYSTEM FOR SECURING DATA STORED ON RFID TAGS

(75) Inventors: Timothy M. Zimmerman, Waxhaw, NC (US); Kelly J. Ungs, Marion, IA (US)

(73) Assignee: Intermec IP Corp., Everett, WA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/747,461

(22) Filed: May 11, 2007

(65) Prior Publication Data

US 2007/0285206 A1   Dec. 13, 2007

Related U.S. Application Data

(63) Continuation of application No. 11/131,100, filed on May 17, 2005, now Pat. No. 7,298,268.

(51) Int. Cl.
G08B 13/14 (2006.01)
(52) U.S. Cl. ............... 340/572.1; 340/572.4; 340/10.1; 340/10.5
(58) Field of Classification Search ............... 340/572.1, 340/572.4, 10.1, 10.3, 10.5, 10.51, 10.52, 340/5.21–5.27, 5.74, 5.2, 5.3, 5.6, 5.61, 5.8, 340/825.56
See application file for complete search history.

(56) References Cited

U.S. PATENT DOCUMENTS

| 4,438,298 | A | * | 3/1984 | Rubin | 379/29.01 |
|---|---|---|---|---|---|
| 4,882,474 | A | * | 11/1989 | Anderl et al. | 235/380 |
| 5,448,045 | A | * | 9/1995 | Clark | 235/382 |
| 5,578,808 | A | * | 11/1996 | Taylor | 235/380 |
| 5,629,981 | A | * | 5/1997 | Nerlikar | 713/168 |
| 5,719,387 | A | * | 2/1998 | Fujioka | 235/492 |
| 6,043,753 | A | * | 3/2000 | Okayasu et al. | 340/5.26 |
| 6,130,622 | A | * | 10/2000 | Hussey et al. | 340/5.61 |
| 6,734,797 | B2 | * | 5/2004 | Shanks et al. | 340/572.4 |
| 6,754,323 | B1 | * | 6/2004 | Chang et al. | 379/205.01 |
| 6,957,333 | B2 | * | 10/2005 | He | 713/168 |
| 7,002,474 | B2 | * | 2/2006 | De Souza et al. | 340/572.3 |
| 7,298,268 | B2 | * | 11/2007 | Zimmerman et al. | 340/572.1 |
| 2005/0278222 | A1 | * | 12/2005 | Nortrup | 705/17 |
| 2006/0077034 | A1 | * | 4/2006 | Hillier | 340/5.61 |
| 2007/0040654 | A1 | * | 2/2007 | Lee et al. | 340/10.1 |

* cited by examiner

Primary Examiner—Toan N Pham
Assistant Examiner—Travis R Hunnings
(74) Attorney, Agent, or Firm—Shook, Hardy & Bacon LLP

(57) ABSTRACT

A system and method for limiting the reading out of data from an RFID tag by requiring a reader of the tag to be authenticated by providing the correct key to the tag, static or rotating, before the tag will transmit data. The limitation of transmission is done irrespective of whether the data is encrypted or not. The system and method may have a segmented or tiered access scheme where segments or portions of the data stored in the RFID tag are accessible by differing keys. Additionally, different encryption keys or schemes may be employed to provide differing encryption methods for the data in the differing segments or portions of the data stored in the RFID tag.

18 Claims, 3 Drawing Sheets

READ AUTHENTICATION METHOD AND SYSTEM FOR SECURING DATA STORED ON RFID TAGS

CROSS-REFERENCE TO RELATED APPLICATIONS

This application is a continuation of U.S. application Ser. No. 11/131,100, filed May 17, 2005, now pending, entitled READ AUTHENTICATION METHOD AND SYSTEM FOR SECURING DATA STORED ON RFID TAGS, and is herein incorporated by reference.

STATEMENT REGARDING FEDERALLY SPONSORED RESEARCH OR DEVELOPMENT

None.

FIELD OF THE INVENTION

One embodiment relates to RFID tags and the systems and methods used to write, read, encrypt, lock and access such RFID tags.

BACKGROUND OF THE INVENTION

In the past, RFID tags have used data encryption techniques to restrict unauthorized access of information stored on such tags.

Additionally, authentication techniques have been used to selectively grant write and lock privileges for some RFID tags.

However, while such attempts have been employed to restrict use of RFID tag information, they do not meet all the needs in the industry. In many examples of RFID tags, the tags are embedded into products, and thereafter they are widely dispersed. For many of these applications, there is no practical way to limit or restrict unwanted users from interrogating RFID tags after they have been embedded in a product which leaves the influence of the entity entering or having responsibility for the information. Encryption of the data on the tags has been used to limit access to the underlying information. However, it is well known that the more opportunities one has to sample examples of coded or encrypted information, the easier it is to crack the code and break into the encryption scheme. Many users of RFID tags would like to better secure their data stored on RFID tags after the tags have been widely dispersed.

Consequently, there exists a need for improved systems and methods for protecting the security of information stored on RFID tags.

SUMMARY OF THE INVENTION

It is an object of one embodiment to provide a system and method for improving the security of information stored on and read out by RFID tags in an efficient manner.

It is a feature of one embodiment to utilize a pre-read authentication scheme to restrict transmission of data from an RFID tag to only authorized recipients.

It is an advantage of one embodiment to achieve improved security by limiting unauthorized access to data (albeit encrypted) from RFID tags and the resulting illicit use of such encrypted data to crack encryption codes which are employed for protecting said information.

The present invention is a system and method for restricting users from reading data both encrypted and unencrypted, from an RFID tag without first being authenticated as a proper recipient of such data, which system is designed to satisfy the aforementioned needs, provide the previously stated objects, include the above-listed features, and achieve the already articulated advantages. One embodiment is carried out in a "free tag access-less system" in a sense that the ordinary free access to interrogate and receive transmission of data (albeit often encrypted) from RFID tags, has been greatly reduced.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
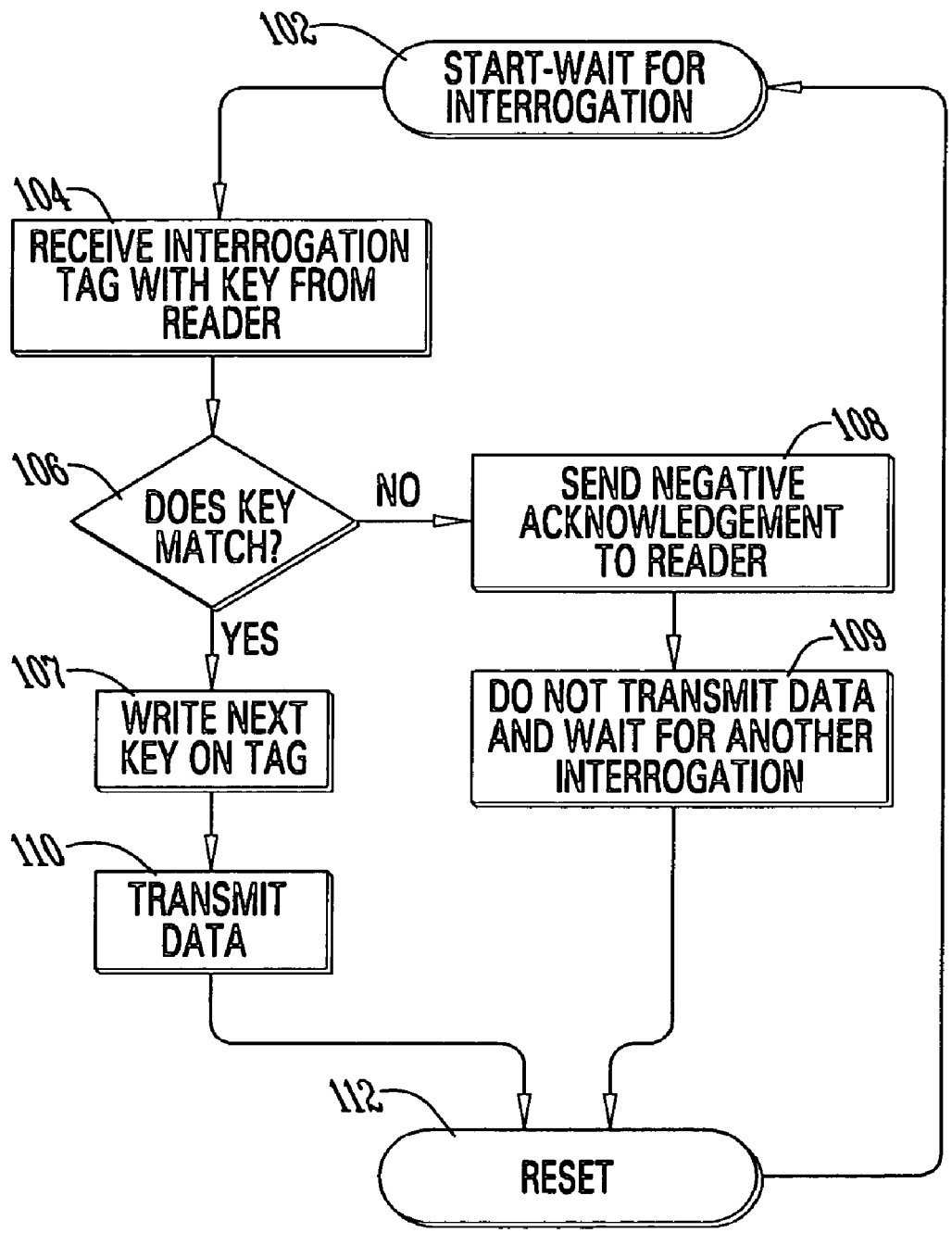
FIG. 1 is a flow diagram of a process and system of the present invention, where transmission of data by the RFID tag involves a requirement to authenticate the reader's authority to access the data prior to transmission of any data whether it is encrypted or not.

Now referring to the drawings wherein like numerals refer to like matter throughout, and more specifically referring to FIG. 1, there is shown a flow diagram of the system of the present invention.

Figure 2:
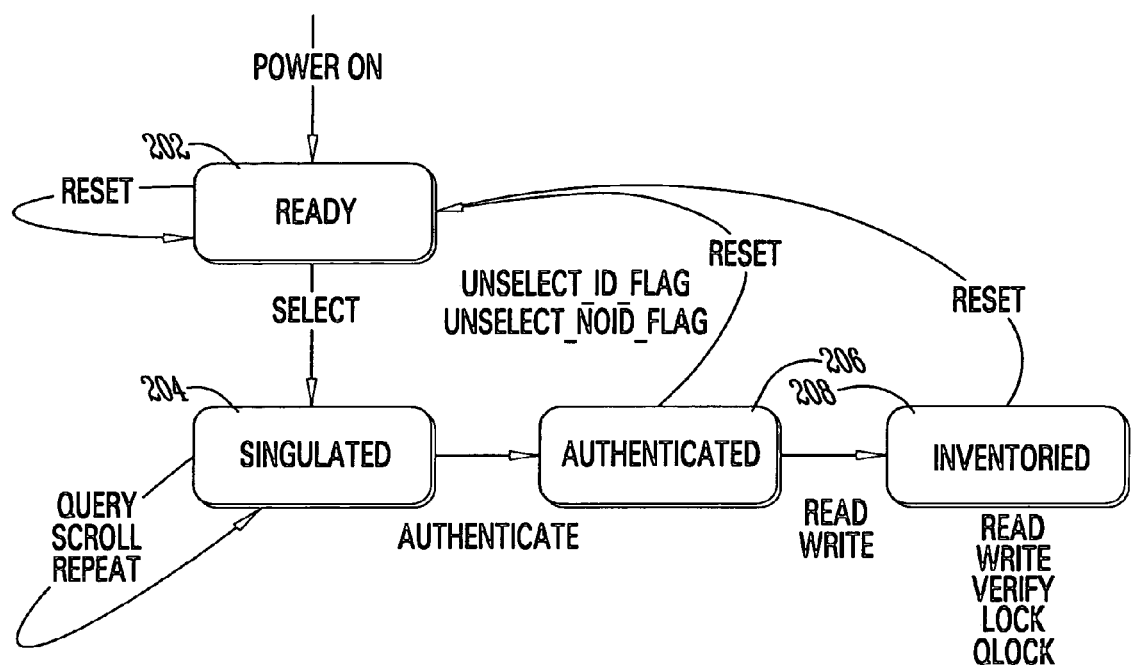
FIG. 2 is a simplified block diagram description of a modified state diagram for RFID tag of the type used to perform the authentication function of the present invention.

The process of one embodiment will be implemented within an RFID tag, which is well known in the art. Minor changes to the state diagram of the RFID tag will accomplish the necessary functions of the present invention. One prior art RFID tag that could be readily adapted to carry out one embodiment is the SL2 ICS10 I Code EPC Smart Label Integrated Circuit by Philips Electronics. Other RFID tags could be used as well. The aforementioned Philips RFID tag is provided merely as an example. FIG. 2 (discussed below) provides some changes to the state diagram of such an RFID tag as would be helpful in carrying out the new features of the present invention.

In general, the novel process of one embodiment would be as follows:

Step 102: The RFID tag waits for an interrogation to occur.

Step 104: The RFID tag receives an interrogation tag from a tag reader.

Step 106: If the interrogation tag contains the appropriate key (see discussion below), then:

Step 107 is as follows: the Next Key is written on the information to be transmitted by the tag and the process proceeds to Step 110 (transmit data).

However, if the Key does not match in Step 106, then the next key is not written and instead the process proceeds to:

Step 108 which is that a negative acknowledgment is sent to the reader.

But in accordance with Step 109, no user data (whether encrypted or not) is transmitted to the reader.

After the data has been sent per Step 110 or the data is not sent per Step 109, the RFID tag resets itself and again awaits an interrogation to occur and the process repeats with Step 102.

An alternate embodiment of the present invention may substitute a tiered or segmented access approach for the simple authorized/not authorized approach discussed above. In a tier access approach, multiple passwords or keys can be used to access segmented regions of the information stored on the tag. For example, one key may provide limited access to information requiring minimal security, while another different key or password may give more detailed information. This system can be used to provide varying information to the various users in a product distribution channel. For example, a retail customer may have the ability to access information from an in-store reader which provides a predetermined key; the information would be targeted to what the customer would typically want to know, price, date of manufacture, expiration date, etc. The retailer may desire additional or different information relating to cost, date it was acquired by the retailer, etc. A distributor may want to track yet different information, different cost, manufacturer sales incentives, etc. A tiered or segmented tag system would allow more users to benefit from some of the information on the tag while protecting certain predetermined information from being available to others.

In this segmented data embodiment of the present invention, differing data encryption schemes can be deployed for differing segments of the tag. For example, no encryption might be employed on the data stored in the tag which is to be read by the retail customer; the data to be read only by the retailer may employ a first data encryption scheme; and the data to be read by a distributor may employ a second and different data encryption scheme. Utilizing the segmented data with differing encryption schemes, one of the goals of one embodiment is to limit the ability for unauthorized users to have access to encrypted data from which they could attempt to decrypt the data. The differing data encryption schemes may be just using the same system of the program to encrypt data and using different keys, or it may be utilizing different programs and methods to encrypt the data.

A more detailed understanding of a particular possible implementation of the present invention can be achieved by now referring to FIG. 2, which generally shows a more detailed view of a possible state diagram of an RFID tag which could implement the present invention. RFID tags may have a Lockable State Machine which is used to refer to locking; i.e., fixing of certain data by the state machine or microprocessor and not the prohibiting transmission of data which is the novel feature of the present invention. In prior art Lockable State Machines, the data was still transmitted even if it were locked or fixed. The State Machine in the above-referenced Phillips RFID tag is not a lockable State Machine, and its implementation of the process outlined in FIG. 1 would be straight forward and within the skill of one in the art. FIG. 2 is directed to the more complex locking State Machines. The step 202 represents a ready state where the integrated circuit is ready to accept incoming data after it has been reset from the prior process implementation. Step 204 is the process of separating queries from multiple RFID readers or multiple attempts by the same reader. Step 206 is where the authentication step of one embodiment would occur. Here, rotating keys can be deployed such as are typical with WEP keys in providing security for wireless LANs. The next key can be transmitted with the data so the reader can maintain an updated key.

Step 208 is the inventorying of the available options that exist after the authentication occurs. In general, any RFID tag could be made to implement one embodiment by disabling all READ and WRITE (including those which are controlled via privileges, etc.) functions except the authentication functions until the reader has been authenticated and, therefore, authorized to receive any data irrespective of whether it is encrypted or not.

Figure 3:
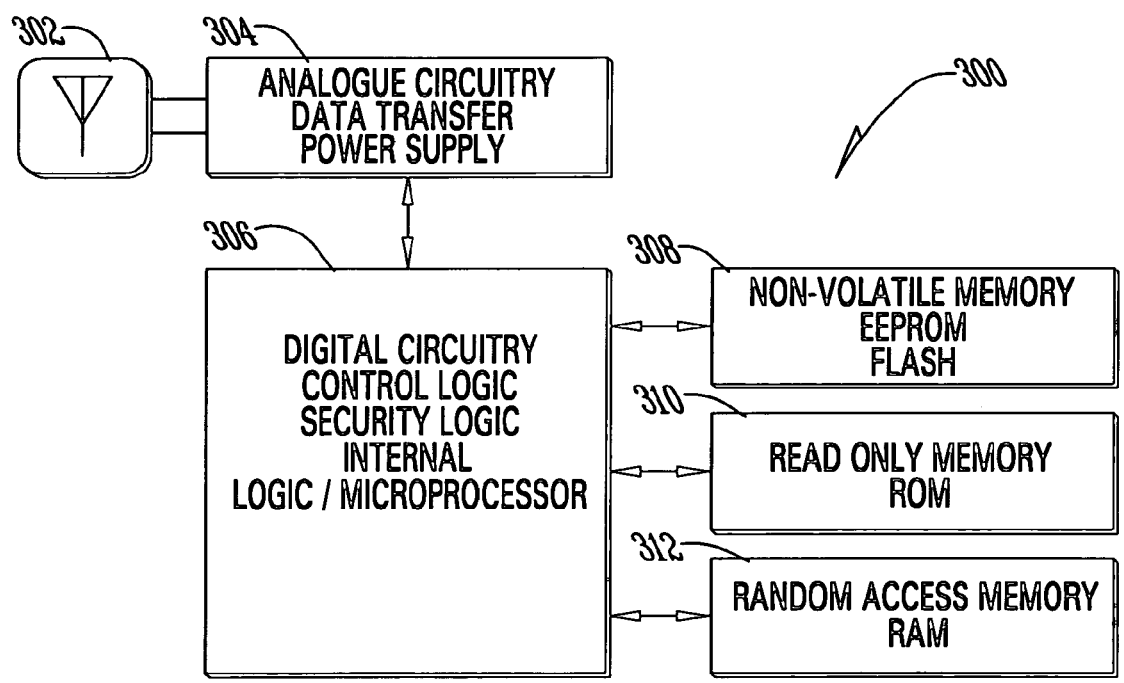
FIG. 3 is a simplified schematic block diagram of the hardware of an RFID tag which is configured to control the authentication processes of the present invention.

A more thorough understanding of the present invention can be obtained by now referring to FIG. 3, which shows a diagram of the hardware of a representative RFID tag, generally designated 300, which is configured to perform the present invention. The tag 300 includes an RFID tag antenna 302 which receives signals from and transmits signals to a reader (not shown). RFID tag analog circuitry 304 provides for data transfer (and power supply in an active RFID tag). Digital circuitry 306 can be many types of digital circuitry, including dedicated logic devices, gate arrays, a microprocessor or other digital signal processing circuitry, together with any necessary software. RFID tag digital circuitry 306 provides the control logic and security logic for the RFID tag 300. RFID tag digital circuitry 306 communicates with RFID tag non-volatile memory (EEPROM/FLASH), RFID tag ROM 310, and RFID tag RAM 312. The process of one embodiment can be carried out by the control logic circuitry or the microprocessor in conjunction with software and data stored in the various forms of memory typically found in an RFID tag. The details of this RFID tag are merely exemplary of the various tags which could be utilized by a person skilled in the art. It is the intention of the present invention to cover any type of hardware or software combination which performs the functions of the present invention.

A more detailed understanding of one embodiment can be achieved by reviewing the table below which shows a Tag memory architecture suitable for the present invention. Predetermined segments of the user data segment can be used to store the keys used for authentication. The Tag Memory Layout field can be used to identify those segments of the user data which contain the keys and the Next Keys.

|  | Bytes | Field Name | Written | Locked |
|---|---|---|---|---|
| Unique Value[1] | 0-7 | Tag ID | Mfg. | Mfg. |
| Memory Type & Size[2] | 8-9 | Tag Manufacturer | Mfg. | Mfg. |
|  |  | Tag Hardware Type | Mfg. | Mfg. |
| Tag Application and Data Presentation[3] | 12-17 | Tag Memory Layout | Mfg. or Application | As required by Application |
| User Data | 18-127 | User Data | Application | As required |

[1]Allows for * 2 ^ 64 = 18,446,744,073,709,551,616 unique tags; ISO Standards
[2]Allows different tag types and tag vendors to interoperate; ISO Standards
[3]Allows tags from different user communities and their application requirements (e.g., different functional and data requirements) to co-exist without interfering with each other; ISO & Contributing User Community Organizations Throughout this description, numerous references are made to "RFID" which is intended to mean radio frequency identification, which is a well-known term which is understood in the industry. Unless otherwise stated, the term "RFID tags" as used herein is intended to refer to both passive RFID tags (those without a power supply) and active RFID tags (those with a power supply/battery).

Throughout this description, references were made to retail customer, retailer, distributor, etc. These references are intended to be merely examples of types of users which might have access to differing segments of data. The present invention is not intended to be limited just to such a distribution channel or to a distribution channel at all.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A process for maintaining security of information stored on a radio frequency identification (RFID) tag comprising the steps of:
   storing predetermined data on an RFID tag according to a level of security;
   interrogating said RFID tag with an RFID tag reader by providing a requesting key to said RFID tag, wherein said requesting key is a changing key in a rotating key authentication system;
   comparing said requesting key to a predetermined stored key associated with the level of security and determining if a match exists; and
   transmitting said predetermined data in response to and only if said match exists.

2. The process of claim 1, further comprising the steps of:
   transmitting a negative acknowledgment in response to and only if said match does not exist.

3. The process of claim 1, wherein said predetermined data is encrypted.

4. The process of claim 3, wherein said RFID tag provides restricted privileges for writing portions of said predetermined data.

5. The process of claim 3, further comprising the steps of:
   transmitting a negative acknowledgment in response to and only if said match does not exist.

6. The process of claim 1, wherein said predetermined data is not encrypted.

7. The process of claim 1, further comprising the steps of:
   encrypting said predetermined data, based on said requesting key, according to a first encryption scheme; and
   transmitting said encrypted predetermined data in response to the interrogation of said RFID tag with said requesting key.

8. The process of claim 7, further comprising the steps of:
   encrypting said predetermined data, based on the requesting key, according to a second encryption scheme that is different from said first encryption scheme; and
   transmitting said encrypted predetermined data according to said second encryption scheme in response to the interrogation of said RFID tag with said requesting key.

9. The process of claim 1, further comprising the step of, incident to comparing said requesting key to a predetermined stored key, locking portions of said predetermined data.

10. The process of claim 1, wherein:
    the step of storing predetermined data on an RFID tag, further comprising storing different data into predetermined segmented regions of the RFID tag;
    the step of comparing said requesting key to a predetermined stored key, further comprising comparing said requesting key to one of a plurality of predetermined stored keys where each key is associated with a different subset of the predetermined segmented regions of the RFID tag; and
    the step of transmitting said predetermined data in response to and only if said match exists, further comprising the steps of transmitting only a predetermined subset of said predetermined segmented regions of the RFID tag which has been previously associated with the requesting key.

11. The process of claim 10, wherein one of said plurality of predetermined stored keys is a key which is a master key which allows access to all information on said RFID tag.

12. The process of claim 11, wherein one of said plurality of predetermined stored keys is a limited access key which only allows access to less than all information stored on said RFID tag.

13. A system for providing information to an RFID reader comprising:
    an RFID tag comprising:
    digital circuitry therein which is configured to at least aid in selectively disabling reading out of one or more predetermined subsets of data from said RFID tag until and unless said RFID tag receives in an interrogation from an RFID reader a reader key which matches a tag key which has been previously assigned to said one or more predetermined subsets of data stored on said RFID tag, wherein said digital circuitry therein is further configured to employ differing encryption schemes for said one or more predetermined subsets of data stored on said RFID tag; and
    an antenna for transmitting said predetermined data.

14. The system of claim 13, wherein said data excludes a negative acknowledgment indicating that no match has occurred between the reader key and the tag key.

15. The system of claim 14, wherein said digital circuitry is control logic configured to perform as a state machine.

16. The system of claim 13, wherein said digital circuitry is a microprocessor in conjunction with software stored in memory coupled to said microprocessor, which are configured to perform as a state machine.

17. The system of claim 13, wherein a predetermined master reader key provides access to all information stored on said RFID tag.

18. A process for securing functionality of a radio frequency identification (RFID) tag comprising the steps of:
    storing predetermined data on an RFID tag;
    interrogating said RFID tag with an RFID tag reader by providing a requesting key to said RFID tag;
    comparing said requesting key to one or more predetermined stored keys associated with RFID tag functions comprising of reading the stored predetermined data, writing to the stored predetermined data, and locking the stored predetermined data;
    determining if one or more matches exists; and
    enabling, in response to the one or more determined matches, the associated RFID tag functions.

* * * * *